Figure 5:
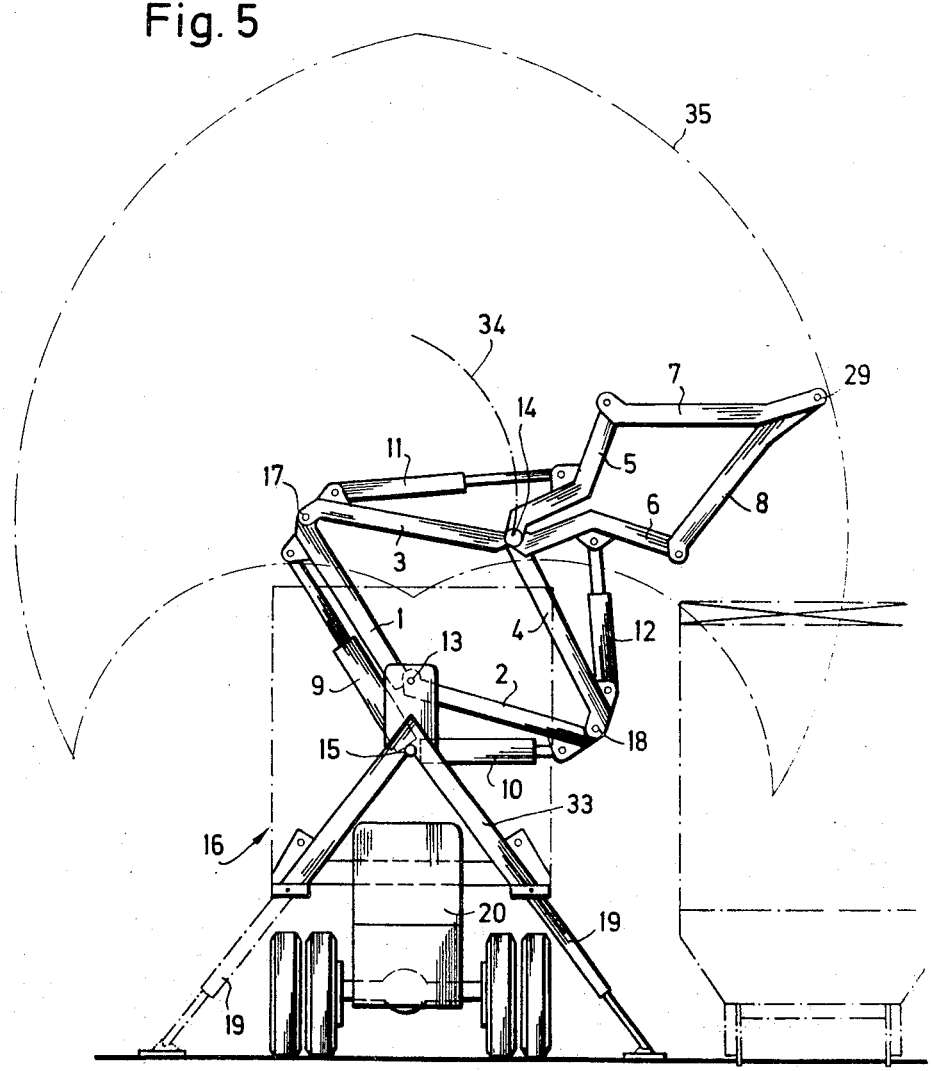

United States Patent [19]
Klaus et al.

[11] 3,774,789
[45] Nov. 27, 1973

[54] LOADING APPARATUS FOR TRANSPORT VEHICLES

[76] Inventors: Kaspar Klaus, Illerstrasse 14, Memmingen; Georg Felkel, 7951 Berkheim, both of Germany

[22] Filed: Jan. 10, 1972

[21] Appl. No.: 216,661

[30] Foreign Application Priority Data
Dec. 8, 1971 Germany.................. P 21 61 033.3

[52] U.S. Cl. ............................... 214/77 R, 212/8 R
[51] Int. Cl. ............................................. B60p 1/48
[58] Field of Search ..................... 214/77 R, 78, 80; 212/8 R, 35 R, 35 HC, 8 B

[56] References Cited
UNITED STATES PATENTS

| | | | |
|---|---|---|---|
| 3,612,308 | 10/1971 | Klaus | 214/77 R |
| 3,513,997 | 5/1970 | Heyer et al. | 214/77 R |
| 3,515,295 | 6/1970 | Klaus | 214/77 R |
| 3,298,539 | 1/1967 | Sundstrom | 212/35 R |
| 3,010,590 | 11/1961 | Troth | 214/77 R |

*Primary Examiner*—Robert J. Spar
*Attorney*—Holman & Stern

[57] ABSTRACT

A vehicular loading and unloading apparatus, for example for handling container traffic, comprises two loading appliances, one fore and one aft of the vehicle, each comprising at least one quadrilateral lever and linkage system with a power unit to extend and contract it. There are preferably two such systems arranged end to end in each appliance, this giving a large operating range allied with a compact collapsed structure.

11 Claims, 5 Drawing Figures

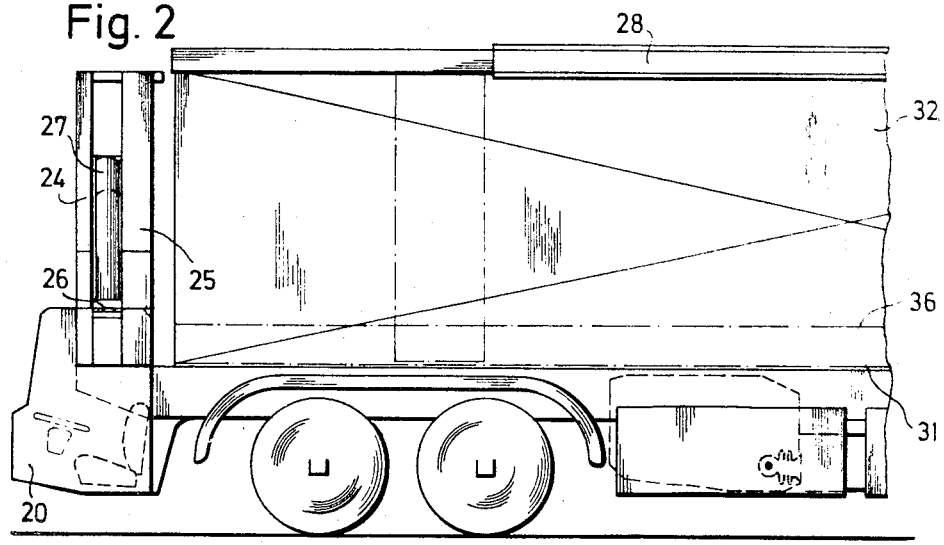
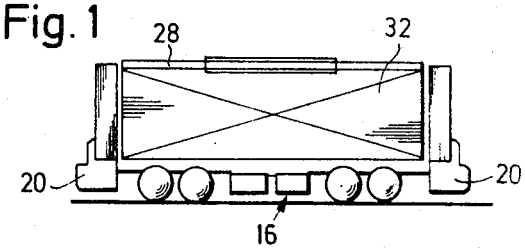
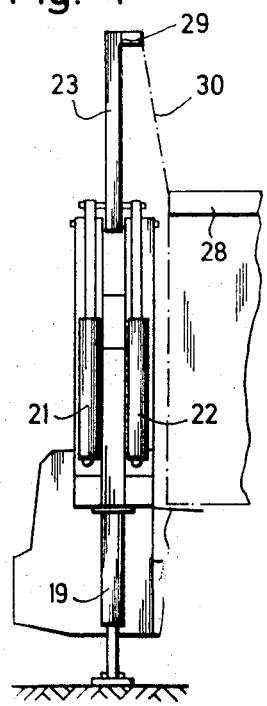
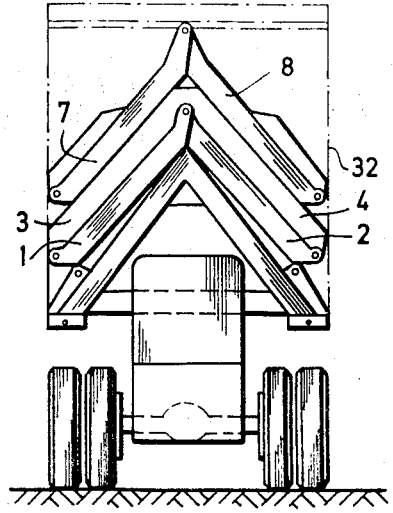

LOADING APPARATUS FOR TRANSPORT VEHICLES

This invention relates to loading apparatus, for example with hydraulic operation, for loading and unloading at least a substantial part of the load on a transport vehicle in a single action.

The types of loading apparatus with which the invention is concerned are those used more especially for the loading and unloading of containers, but it is also applicable to other large loads, for example stacks of bricks or blocks, portable building units, and so on.

The type of apparatus concerned usually comprises two loading appliances which are arranged fore and aft of the load on the vehicle, as related to the direction of travel.

A loading apparatus of this kind has the particular function of taking up the load at one specific site and disposing it on the vehicle carrying the apparatus or transferring it to another vehicle. The loading apparatus, along with the vehicle, therefore has to perform the two duties both of a transporting vehicle and also a loading contrivance. Frequently there is the additional requirement that the whole assembly shall be capable of road travel.

It is particularly important in this connection that the loading operation shall be performed quickly and easily, and as a general rule this can only be implemented if the loading apparatus has a working range which will extend over both sides of the vehicle.

The object of the invention is to improve loading apparatus of this kind.

It is a further object of the invention to devise the apparatus in such a way that the working range shall be identical or symmetrical, entirely or to a major extent, at the sides of the vertical. A further object of the invention is to acquire a large working range both vertically and horizontally. A further and important object is to provide an apparatus which will be able to lift loads to such a height that these loads can be stacked on one another, perhaps a plurality of times, or even carried over loads which have already been deposited on the vehicle or adjacent the same.

To this end we prescribe an apparatus for the purpose described of the kind comprising two loading appliances disposed one fore and one aft of the position of a load on the transport vehicle, each of said loading appliances having a working range extending over each of the two sides of the vehicle, and in an apparatus of this kind we present the improvement wherein each said loading appliance includes at least one operating system comprising four intercoupled links and two independently operable driving means for moving the same, the said intercoupled links comprising two inner links and two outer links which are pivotally connected together at their outer ends, said outer pair of links being carried and operated by the inner pair of links, and the mountings of the inner links being disposed adjacent one another.

In particular the arrangement presented by this invention in which the inner links are close to one another affords the possiblity of combining large sized links with the possibility of collapsing them into a compact space. Long links confer the benefit of a large working zone and the facility for collapsing them in a small and compact area is again appropriate if the requirement for transport and travel is to be catered for as, for example, when the vehicle is to travel along a road.

In a very advantageous form of the invention two operating systems of the type indicated are combined in such a way that one such system, viz. an outer one, shall be supported by an inner operating system. It has been found that the facility for collapsing an operating system which is of link and lever form permits more than one such system to be used but nevertheless the whole to be collapsible into a compact assembly.

The driving means, which may for example advantageously consist of hydraulic piston/cylinder units, will advantageously be mounted and supported at the central part of the vehicle, in which event the two cylinder units of an operating system may share a common support point or be supported at points which are only a small spacing from one another.

Other features of the invention are disclosed hereafter in the ensuing description of preferred embodiments, and in the accompanying claims.

Embodiments of the invention are illustrated in the accompanying drawings, in which:

FIG. 1 is a diagrammatic side view of a transport vehicle having a loading device in accordance with the invention, FIG. 2 is a fragmentary side view on a larger scale of the vehicle illustrated in FIG. 1, FIG. 3 is an end view of the vehicle of FIGS. 1 and 2, FIG. 4 is a fragmentary side view of a part of a modified form of loading apparatus in accordance with the invention, and FIG. 5 is an end view corresponding to FIG. 3 but showing the loading apparatus in performance of a loading operation.

The vehicle 16 depicted in FIG. 1 is a four-axial truck and is particularly intended for transshipment of loads in railroad stations or for other purposes. This vehicle, the four axles of which are coupled, can also be used as a road transport vehicle. The construction of vehicle 16 is substantially symmetrical. It has two operators platforms 20, one at each end.

FIG. 1 shows the vehicle carrying its load, for example a container 32. A loading frame 28, preferably of variable effective length, is used for the loading operation. This frame 28, or so-called spreader, either engages appropriate abutment means at the upper end of container 32 and/or engages this load at the bottom through draw elements or other means. The provisions for varying the effective length is of importance in that it enables loads of differing lengths to be handled, to which end the loading appliances (described in more detail below) are of variable spacing, and in particular can be displaced to vary the distance between them.

Particular reference will now be made to FIG. 5, which shows the loading apparatus in operation, because this best illustrates the individual parts.

Disposed at the front, and to the rear, of a load 32 on vehicle 16 there is in each case a displaceable frame 33 which is generally in the form of an "A", i.e. has the general shape of an equilateral triangle. This frame supports a hoisting gear comprising two intercoupled operating systems of lever and linkage form. The first of these systems comprises two inner links 1 and 2 which are pivoted to frame 33 at 13, and two outer links 3 and 4 pivoted to the inner links 1 and 2. The pivots between the links 1 and 3 and the links 2 and 4 are designated 17 and 18 respectively. This first operating system is actuated by piston/cylinder units 9,10. Coupled to this first and inner operating system 1,2,3,4 through a pivot 14 is a second system which basically comprises links 5,6,7 and 8. The outerlinks 7 and 8 of this second system are pivoted at 29 and here are provided with means (not shown) for connection to the load. Further piston/cylinder units 11 and 12 are used to operate the second and outer system.

If, starting from the position of the parts illustrated in FIG. 5, it is assumed that unit 10 is operated to displace the piston therein and cylinder 9 is not operated, the result will be that pivot 14 will transcribe the path illustrated by the chain dotted line 34. If to this is added the potential movement of the outer lever and linkage system, it will be found that the load connection point 29 can transcribe a range defined by the chain dotted line 35. It will be observed that this will take it a substantial difference laterally of the vehicle and that loads can therefore be picked up at a distance from the latter. Further it is possible to stack loads or to transfer them over a load which has already been deposited on vehicle 16.

Strut-forming legs 19 are provided to increase the stability of the vehicle and the loading apparatus during a loading or unloading operation. These legs 19 are movable in guides in the frame 33 which encompasses the corresponding platform 20. The legs 19 may for example be telescopic so as to be projectible and retractible and the feet thereof may be such as to enable the distance of the ground support point from the vehicle to be varied.

FIG. 3 shows the operating lever and linkage systems in a collapsed condition and from this it will be apparent that the respective pairs of links have an inverted chevron form, and that these chevrons are arranged one above another with the corresponding sets of links more or less parallel. In this condition the lowermost pair of links 1 and 2 define between them a utility area which accommodates the frame 33 and platform 20. It will also be observed that the collapsed links do not project above the load at any point.

In view of the substantial hoisting height (see FIG. 5) it is feasible to attach frames 28 to the load connection point 29 by draw means 30, which has the further advantage that the loading frames or spreader 28 can be deposited on the vehicle surface 31 for travel purposes, as has been indicated by chain dotted lines 36 in FIG. 2.

In the embodiments illustrated in FIGS. 3 and 5, the two operating systems are so devised and arranged that they virtually rest on one another in the collapsed condition. This arrangement is not however, essential.

FIG. 4 shows that a tandem arrangement of inner operating systems 21 and 22 can be used, these together carrying a third and outer operating system 23 which can be swung down between them in the travel condition. FIG. 2 shows a modification in which both the inner and the outer systems are duplicated, one pair 25, nearest the load 23, being of more robust dimensions than the other pair 24. The driving means 26,27 of these pairs of systems are advantageously disposed in the space between the two systems and thereby protected. The contrasting dimensions in the arrangement of FIG. 2 takes care of the different loading of the two systems.

From the foregoing description of the invention it is clearly apparent that it is of advantage for the pivotal axis 13 of links 1 and 2 to be disposed at a comparatively high level. In the first place this increases the operating height, and on the other hand it has the attribute that when the parts are in the collapsed condition (FIG. 3), the space made available between the outer limit dimensions, for example to comply with road travel provisions, is very well utilised.

Preferably the individual lever and linkage operating systems are so devised that they can fold within one another when they are in the travelling condition, as for instance is seen in FIG. 4. However, even when in operating condition (FIG. 5), it is possible to provide an arrangement which permits the individual parts, for example the inner and the outer systems, and even the various links, to overlap one another by offsetting one relatively to another. They can then for example overlap one within the other or even swing past one another. The same applies to links 7 and 8. This arrangement enables the path transcribed by the load suspension point 29 to be enlarged.

If a comparison is made between FIGS. 3 and 5 it will be observed that the active ambit of the legs 19 and the operating systems are spatially entirely separate from one another. This has the advantage that the legs and the loading apparatus can be used completely independently of one another. In the case of lighter loads for instance, there may be no need to project the legs at all.

The construction of loading apparatus illustrated is of a not inconsiderable weight. This fact, however, even has advantages. Thus, for example, in the position of the parts illustrated in FIG. 5 a considerable proportion of the inner operating system and the associated driving means acts as a counterweight for the outer system. There is thus a high degree of stability, which is very desirable.

It is to be noted that the need to connect the links to one another is not only catered for by, for example, using pivots as depicted at 17, 18 or 13 in the drawing, but the use of intermediate elements between the ends of the individual links is not excluded as a means for engagement between them.

It is to be pointed out that the various instrumentalities described above and devised in accordance with the invention are capable of use not only in combination, but also individually with advantage.

We claim :

1. In an apparatus for loading and unloading at least a substantial part of a load on a transport vehicle in a single operation, said apparatus comprising two loading appliances mounted one fore and one aft of the position of a load on the load-bearing frame of said transport vehicle in the direction of movement of the vehicle, and each of said loading appliances having a working range extending over each of the two sides of the vehicle, the improvement wherein each said loading appliance includes at least one operating system comprising four intercoupled links and two independently operable driving means for moving the same, the said intercoupled links comprising two inner links and two outer links with the outer links being pivotally connected together at their outer ends, load-engaging means attached to the pivotally connected outer ends of the outer links, each of said outer links having its inner end pivotally connected to the outer end of a respective inner link, so that each inner link is connected to a different outer link, and the inner links having their inner ends pivotally connected to each other and to the vehicle, one of said driving means being pivotally mounted between said vehicle and each of the outer ends of the inner links.

2. Apparatus according to claim 1, in which each loading appliance comprises two said operating systems adjoining one another and interconnected, the outer links of a first operating system mounted on the vehicle being connected to and supporting the inner links of a second and outer operating system in the vicinity of the coupling point between said inner links.

3. A loading apparatus according to claim 2, in which said outer operating system has its own independent driving means and said driving means are mounted on said outer links of said first operating system.

4. A loading apparatus according to claim 3, in which each said operating system comprises four links arranged as a quadrilateral, the two inner links of each said system having a common pivot.

5. A loading apparatus according to claim 1, in which said two driving means are mounted on the vehicle at points which are adjacent to one another in a position below the level of the point of attachment of the inner links to the vehicle.

6. A loading apparatus according to claim 1, in which the said two inner links are coupled together and pivotally mounted on said vehicle at a raised support point, whereby said operating system can be collapsed into a condition in which the pivotal connection of said two outer links lies closely above the pivotal mounting of said two inner links on the vehicle, and in which the pivotal connections of the two inner links with the respective two outer links are disposed below said pivotal mounting of said two inner links.

7. A loading apparatus according to claim 6, in which each loading appliance comprises two said operating systems adjoining one another and interconnected, the outer links of a first operating system mounted on the vehicle being connected to and supporting the inner links of a second and outer operating system in the vicinity of the coupling point between said inner links, said operating systems being collapsible into a situation in which the links of said outer operating system are disposed substantially parallel to the corresponding links of said inner operating system.

8. A loading apparatus according to claim 7, in which in the collapsed condition the links are disposed in inverted chevron form and the lower chevron represented by the inner pair of links of the inner operating system define between them a utility area, and in which a pair of divergent support legs are disposed in this utility area.

9. A loading apparatus according to claim 8, in which said support legs are projectible and retractible, and in which an operator's platform is disposed between them in said vehicle.

10. A loading apparatus accordingly to claim 1, wherein each loading appliance comprises two said operating systems arranged in tandem on the vehicle, and a third said operating system arranged between the aforesaid two systems and supported thereby, the pivotal connection between the two inner links of said third system being carried by a common pivotal connection between the outer pairs of links of said two first-mentioned operating systems.

11. A loading apparatus according to claim 1, further comprising a spreader of variable length extending longitudinally of said vehicle between said loading appliances for lifting engagement with a load on the vehicle, and draw means for connecting said spreader to said lifting appliances, whereby this spreader can be lowered on to the body of the vehicle when not in use.

* * * * *